United States Patent
Mallinson

(10) Patent No.: US 8,752,199 B2
(45) Date of Patent: Jun. 10, 2014

(54) HYBRID MEDIA DISTRIBUTION WITH ENHANCED SECURITY

(75) Inventor: Dominic Saul Mallinson, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 139 days.

(21) Appl. No.: 11/558,803

(22) Filed: Nov. 10, 2006

(65) Prior Publication Data

US 2008/0115045 A1  May 15, 2008

(51) Int. Cl.
*H04L 29/06* (2006.01)

(52) U.S. Cl.
USPC ............ 726/28; 726/26; 726/27; 726/29; 726/30; 380/227; 380/231; 380/233

(58) Field of Classification Search
USPC .......... 705/51; 707/1; 713/154, 180; 715/241
See application file for complete search history.

(56) References Cited

U.S. PATENT DOCUMENTS

| | | | | |
|---|---|---|---|---|
| 5,799,128 A | * | 8/1998 | Van Den Enden | 386/68 |
| 5,991,503 A | * | 11/1999 | Miyasaka et al. | 386/329 |
| 6,275,536 B1 | * | 8/2001 | Chen et al. | 375/240.25 |
| 7,024,156 B2 | | 4/2006 | Kawamata et al. | |
| 7,165,175 B1 | * | 1/2007 | Kollmyer et al. | 713/154 |
| 7,260,690 B2 | | 8/2007 | Brucklmayr et al. | |
| 7,386,128 B2 | * | 6/2008 | Moroney | 380/210 |
| 7,437,082 B1 | * | 10/2008 | Smith | 398/175 |
| 7,596,625 B2 | | 9/2009 | Manion et al. | |
| 7,613,298 B2 | | 11/2009 | Lecomte et al. | |
| 7,639,833 B2 | | 12/2009 | Lecomte et al. | |
| 7,643,478 B2 | | 1/2010 | Lecomte et al. | |
| 7,647,642 B2 | | 1/2010 | Erickson | |
| 7,668,312 B2 | | 2/2010 | Lecomte et al. | |
| 7,983,440 B1 | * | 7/2011 | Roberts et al. | 382/100 |
| 2002/0026636 A1 | | 2/2002 | Lecomte et al. | |
| 2002/0056095 A1 | | 5/2002 | Uehara et al. | |
| 2002/0080971 A1 | * | 6/2002 | Fukami et al. | 380/277 |
| 2002/0095582 A1 | * | 7/2002 | Peled et al. | 713/180 |

(Continued)

FOREIGN PATENT DOCUMENTS

WO  2006078029 A1  7/2006

OTHER PUBLICATIONS

Pending Unpublished U.S. Patent Application by Mallinson, Dominic Saul; U.S. Appl. No. 11/696,117, filed Apr. 3, 2007, entitled "Providing Content Using Hybrid Media Distribution Scheme with Enhanced Security", 38 pages, which includes the application specification, claims, and drawings.

(Continued)

*Primary Examiner* — Michael R Vaughan
(74) *Attorney, Agent, or Firm* — Fitch, Even, Tabin & Flannery, LLP

(57) ABSTRACT

A method for use in playing content that is made up of data includes establishing in a device a physical media storing a first portion of the data making up the content, receiving a streamed second portion of the data making up the content, wherein the second portion of the data includes essential information for reconstructing the content from the first portion of the data, and playing the content by combining the first portion of the data with the second portion of the data to correctly reconstruct the content. A method for use in enhancing security of content that is made up of data includes removing information from the data making up the content that is essential for playing the content.

17 Claims, 4 Drawing Sheets

(56) References Cited

U.S. PATENT DOCUMENTS

| | | | |
|---|---|---|---|
| 2002/0104019 A1* | 8/2002 | Chatani et al. | 713/201 |
| 2002/0159750 A1 | 10/2002 | Jasinschi et al. | |
| 2002/0170053 A1 | 11/2002 | Peterka et al. | |
| 2003/0135700 A1 | 7/2003 | Schultz et al. | |
| 2003/0200548 A1* | 10/2003 | Baran et al. | 725/90 |
| 2004/0049694 A1 | 3/2004 | Candelore | |
| 2004/0123125 A1* | 6/2004 | Zuili | 713/193 |
| 2004/0139027 A1* | 7/2004 | Molaro | 705/59 |
| 2005/0076183 A1 | 4/2005 | Medvinsky et al. | |
| 2005/0122430 A1* | 6/2005 | Lee et al. | 348/559 |
| 2005/0193205 A1* | 9/2005 | Jacobs et al. | 713/176 |
| 2005/0201726 A1* | 9/2005 | Malcolm et al. | 386/94 |
| 2005/0223107 A1* | 10/2005 | Mine et al. | 709/231 |
| 2005/0262573 A1* | 11/2005 | Bo et al. | 726/27 |
| 2006/0259433 A1* | 11/2006 | Lahtinen et al. | 705/57 |
| 2007/0050851 A1 | 3/2007 | Musha et al. | |
| 2007/0061568 A1* | 3/2007 | Lee et al. | 713/163 |
| 2007/0071239 A1* | 3/2007 | Fang | 380/228 |
| 2007/0078731 A1 | 4/2007 | Hameen-Anttila et al. | |
| 2007/0094272 A1 | 4/2007 | Yeh | |
| 2007/0201695 A1* | 8/2007 | Saarikivi | 380/231 |
| 2007/0250912 A1 | 10/2007 | Rassool et al. | |
| 2008/0092240 A1 | 4/2008 | Sitrick et al. | |
| 2008/0216177 A1 | 9/2008 | Yokosato et al. | |
| 2008/0263611 A1 | 10/2008 | Lecomte | |
| 2009/0055932 A1* | 2/2009 | Kuroda | 726/26 |
| 2012/0079514 A1* | 3/2012 | Riedl et al. | 725/5 |

OTHER PUBLICATIONS

USPTO; Non-Final Office Action issued in U.S. Appl. No. 11/696,117; mailed Apr. 22, 2010; 16 pages.

USPTO; Office Action issued in U.S. Appl. No. 11/696,117; mailed Apr. 1, 2011; 22 pages.

USPTO; Advisory Action issued in U.S. Appl. No. 11/696,117; mailed Jan. 7, 2011; 3 pages.

USPTO; Final Office Action issued in U.S. Appl. No. 11/696,117; mailed Oct. 14, 2010; 21 pages.

USPTO, Final Office Action issued in U.S. Appl. No. 11/696,117 mailed Aug. 29, 2011, 24 pages.

Japanese Patent Office, Japanese Application No. 2005-015964, dated Jan. 24, 2005, 38 pages.

Dimitris Thanos et al., Commercial Dissemination of Video over Open Networks: Issues and Approaches, 2000, Retrieved from http://asg.unige.ch/site/papers/ThKo01.pdf, pp. 1-14.

USPTO; Office Action issued in U.S. Appl. No. 11/696,117, mailed Aug. 13, 2013, 19 pages.

USPTO; Notice of Allowance issued in U.S. Appl. No. 11/696,117, mailed Jan. 6, 2014, 9 pages.

* cited by examiner

HYBRID MEDIA DISTRIBUTION WITH ENHANCED SECURITY

BACKGROUND OF THE INVENTION

1. Field of the Invention

The present invention relates generally to the security of digital content, and more specifically to media copy protection schemes.

2. Discussion of the Related Art

The proliferation of digital content and the ability to make unlimited generations of perfect copies of such content has provided consumers, distributors and content providers with immense convenience, efficiency and flexibility. Digital content can be easily copied onto physical media such as DVDs, CDs, hard disc drives, USB storage devices, etc., and can also be easily distributed via the Internet. Unfortunately, however, such conveniences also provide a wealth of opportunities to those who endeavor to make illegal copies of such content and/or illegally distribute such content via the Internet.

It is with respect to these and other background information factors that the present invention has evolved.

SUMMARY OF THE INVENTION

One embodiment provides a method for use in playing content that is made up of data, comprising: establishing in a device a physical media storing a first portion of the data making up the content; receiving a streamed second portion of the data making up the content, wherein the second portion of the data includes essential information for reconstructing the content from the first portion of the data; and playing the content by combining the first portion of the data with the second portion of the data to correctly reconstruct the content.

Another embodiment provides an apparatus for use in playing content that is made up of data, comprising: a physical media storing a first portion of the data making up the content; and a processing system configured to receive a streamed second portion of the data making up the content, wherein the second portion of the data includes essential information for reconstructing the content from the first portion of the data; wherein the processing system is further configured to play the content by combining the first portion of the data with the second portion of the data to correctly reconstruct the content.

Another embodiment provides a storage medium storing a computer program executable by a processor based system, the computer program causing the processor based system to play content that is made up of data by executing steps comprising: retrieving a first portion of the data making up the content from a physical storage media; receiving a streamed second portion of the data making up the content, wherein the second portion of the data includes essential information for reconstructing the content from the first portion of the data; and playing the content by combining the first portion of the data with the second portion of the data to correctly reconstruct the content.

Another embodiment provides a method for use in enhancing security of content that is made up of data, comprising: removing information from the data making up the content that is essential for playing the content; establishing a remainder of the data after the removing step as a first portion of the data; and establishing the removed essential information as a second portion of the data.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Further to the above discussion, one technique that has been used in an effort to provide security for digital content is to encrypt the content. Encryption technologies rely upon a very small key to decrypt the data. All of the data for the content is contained in the encrypted data. Therefore, unfortunately, if the encryption key is compromised, the data for the content is all available.

Embodiments of the present invention provide a hybrid media distribution scheme with enhanced security, thus providing copy protection that is believed to provide benefits over the above described encryption technique. In general, in some embodiments, any media or digital content, such as for example a movie, music, game, advertisement, etc., may be distributed in two parts. The first part may comprise unsecured raw data that can be downloaded or distributed by physical media and freely stored on any storage device, such as for example a DVD, DVD-R, HDD, etc.

The second part may comprise a much smaller percentage of the data that is essential to the whole. In some embodiments this second part of the data is only distributed by streaming it from a server to the client device. In some embodiments the streaming may be via a secure online transaction. In this way, this second part of the data is not stored and security methods can be updated to reduce vulnerability. The unsecured data of the first part is useless without the lower bandwidth second part of the data.

Figure 1:
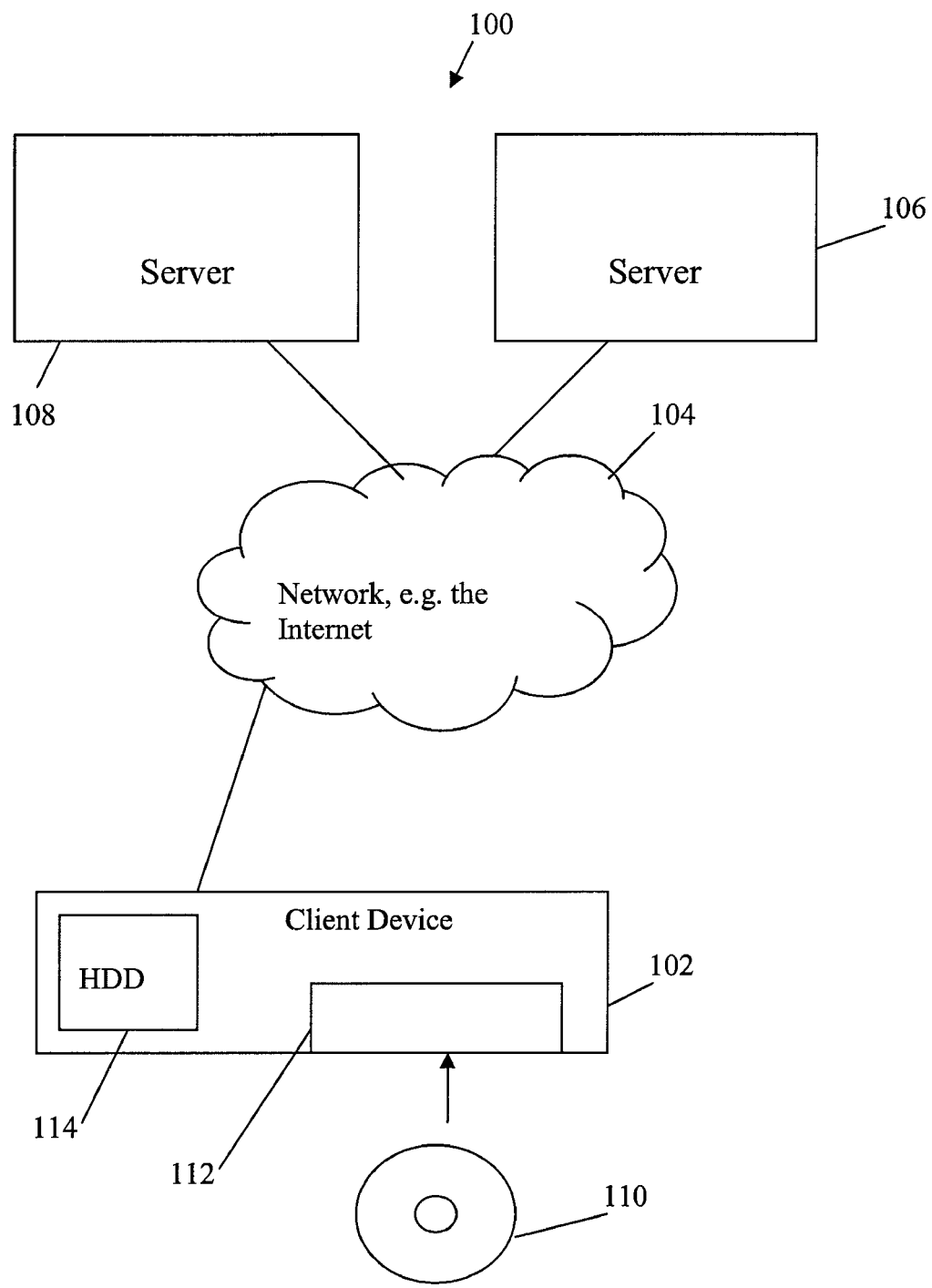
FIG. 1 is a block diagram illustrating a system that operates in accordance with an embodiment of the present invention.

By way of example, FIG. 1 illustrates a system 100 that operates in accordance with an embodiment of the present invention. The system 100 may include a client device 102 that is connected to a network 104, such as for example the Internet. By way of example, the client device 102 may comprise a DVD player, CD player, game console, entertainment system, handheld device, computer, or any other type of device that plays media. In some embodiments the client device 102 may comprise any platform having network connectivity. Also shown connected to the network 104 are servers 106 and 108.

In some embodiments the client device 102 may be capable of receiving physical storage media 110, which for example may comprise a DVD disc, Blu-ray disc, or any other type of media, that is inserted into a drive 112 in the client device 102. In some embodiments the bulk of the data for any type of digital content may be stored on the media 110. Again, the digital content may, for example, comprise a movie, music, game, advertisement, etc. The data stored on the media 110 may be unsecured and not encrypted.

In some embodiments the bulk of the data for the digital content may instead be downloaded from one of the servers 106, 108 and stored on a hard disc drive 114 in the client device 102. Again, this data may be unsecured and not encrypted.

In accordance with an embodiment of the present invention, the data stored on the media 110 or the hard disc drive 114 may be missing an essential quantity of information which makes the data impossible to use by itself. As such, a second smaller amount of data that fills in the blanks may be streamed over a low bandwidth connection. This small amount of data may be streamed from one of the servers 106, 108 over the network 104 to the client device 102. Because it is streamed, this small amount of data is typically not stored long term in the same place as the main data, which makes it harder to effectively copy. Network streaming is often inherently more secure since the method to secure it can be associated with a user authentication and can be changed.

Figure 2:
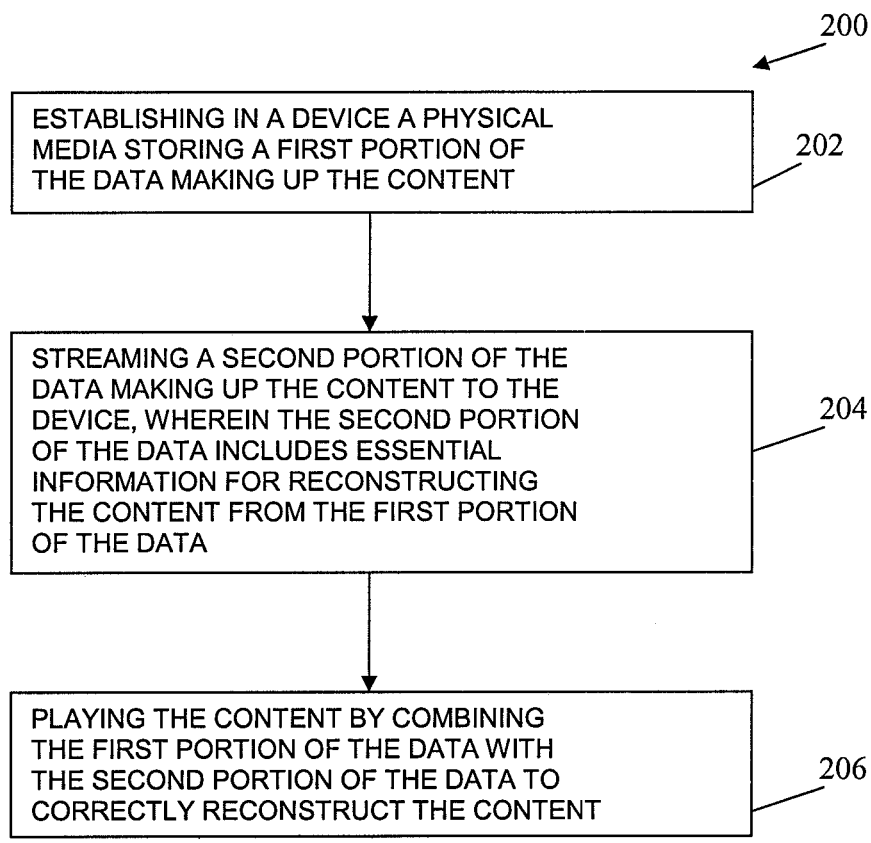
FIG. 2 is a flow diagram illustrating a method for use in playing content in accordance with an embodiment of the present invention.

Referring to FIG. 2, there is illustrated a method 200 that operates in accordance with an embodiment of the present invention. The method 200 may be used for playing content, which is typically made up of or comprises digital data. The method 200 begins in step 202 where a physical media storing a first portion of the data making up the content is established in a device, such as for example a client device. As described above, the physical media may comprise a removable storage device, a hard disc drive, or any other type of storage device.

On its own, the first portion of the data has very little value. This is because in some embodiments throughout the entire movie or other content some critical information of the encoding has been deliberately removed so that reconstitution is impossible based on the first portion of the data alone.

In step 204 a second portion of the data making up the content is streamed to and received by the device. The second portion of the data may include essential information for reconstructing the content from the first portion of the data. Thus, the second portion of the data, which may be referred to herein as "key data", may form a stream of essential information that can be combined with the first portion of the data (i.e. the bulk data) to correctly reconstitute the content. The second portion of the data may be much smaller in size than the first portion of the data.

In step 206 the content is played by combining the first portion of the data with the second portion of the data to correctly reconstruct the content. In some embodiments when the end user inserts the disc into the client device, such as any type of player, the client device may automatically connect to a server, authenticate the user, and start to stream the "key data." The authentication may be subscription based, pay per play, an all time purchase, or any other type of authentication. Because the key data may be so much smaller than the bulk data, the bandwidth and server requirements to stream the key data become much more reasonable even for high definition (HD) quality movies and content.

In some embodiments the security of the system may be further related to the authentication and encryption of the key data and the method of streaming this data to the client device. As with any streaming application, only enough information is stored locally on the client device to prevent stalls and skips due to sporadic network bandwidth. Since in some embodiments this data is also small, it is possible to store it purely in RAM with no persistent storage copy. Again, this makes encryption more secure since potential pirates will find it harder to locate an unencrypted version of the key data stream in RAM. In addition, in some embodiments the method of encryption can be changed if the publisher ever becomes aware of potential hacks or could even be changed regularly as a matter of course. All of these methods make it much harder for a pirate to get the whole key data stream.

Figure 3:
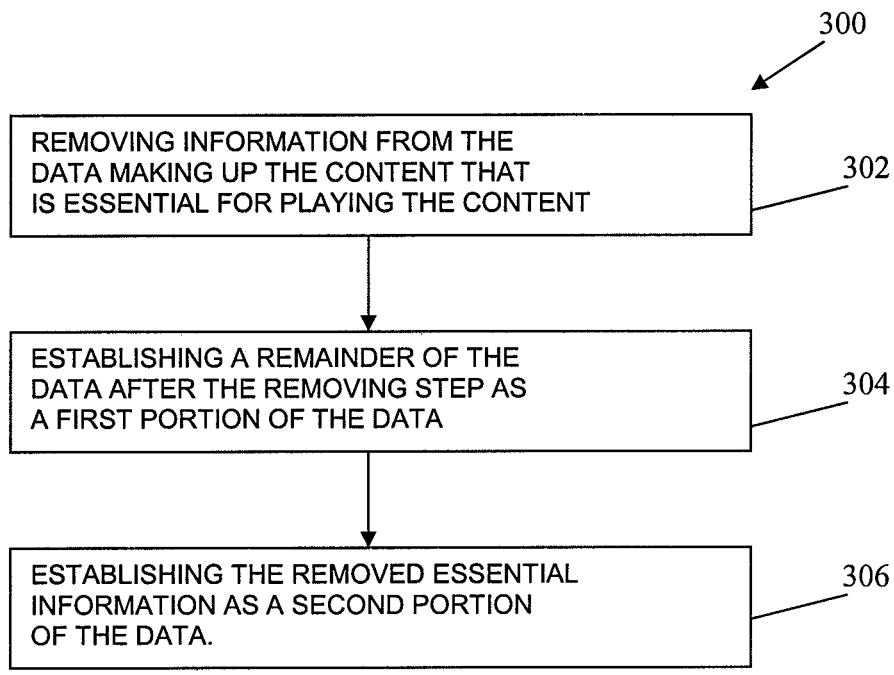
FIG. 3 is a flow diagram illustrating a method for use in enhancing the security of content in accordance with an embodiment of the present invention.

Examples of forming the first and second portions of the data will now be discussed. Referring to FIG. 3, there is illustrated a method 300 that operates in accordance with an embodiment of the present invention. The method 300 may be used in enhancing the security of content, which is typically made up of or comprises digital data. The method 300 begins in step 302 where information that is essential for playing the content is removed from the data making up the content. In step 304 a remainder of the data after the removing step is established as a first portion of the data, and in step 306 the removed essential information is established as a second portion of the data.

As an example application of the method 300, in some embodiments a movie that would normally be distributed on a standard DVD or Blu-ray disc may first be decomposed into two parts by the publisher, distributor, or some other party. This process may begin by first deliberately removing some critical information of the encoding throughout the entire movie so that reconstitution is impossible based on only the remaining data. The remaining bulk of the data may be stored on a physical media, such as for example a DVD or Blu-ray disc. On its own, this data has very little value. The second part of the data, which is the essential information that has been removed, is much smaller in size.

There are many techniques that may be used in accordance with various embodiments of the present invention to separate the bulk data from the key data. By knowing the type of data (e.g. AVC encoded movie), intelligent methods may be used to make sure that the bits and bytes removed from the bulk data are essential.

For example, standard DVDs are encoded with a modified version of the popular MPEG-2 format. An MPEG-2 video bit stream is made up of a series of data frames encoding pictures. The three ways of encoding a picture are: intra-coding (I pictures), forward prediction (P pictures), and bidirectional prediction (B pictures). In the case of I pictures, the actual image data is passed through the encoding process. P and B pictures are first subjected to a process of "motion estimation", in which the encoder searches for similarities with the previous (and in the case of B pictures, also the next) image in time order.

Figure 4:
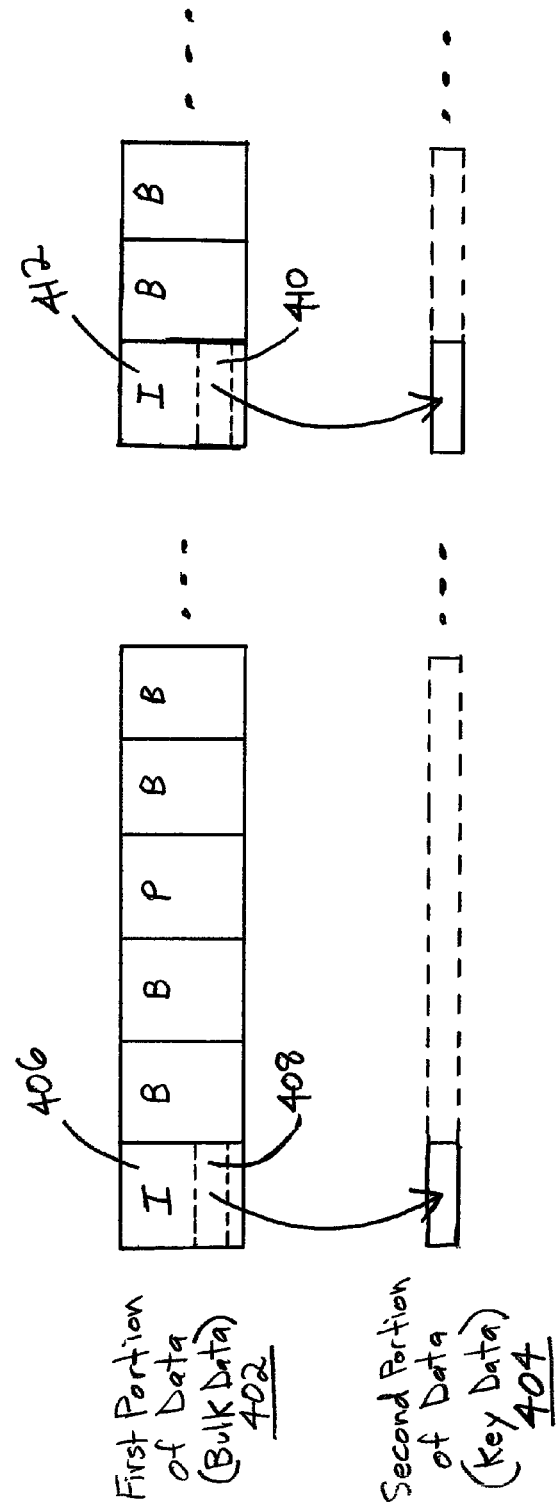
FIG. 4 is a timing diagram illustrating an example technique for separating bulk data from key data in accordance with an embodiment of the present invention.

Referring to FIG. 4, there is illustrated an example technique for separating the bulk data from the key data in accordance with an embodiment of the present invention. In this example, the step of removing essential information from the data making up the content may comprise removing at least a portion of one or more I pictures. Thus, as shown, a portion 408 of the first I picture 406 is removed from the bulk data 402 and established as part of the key data 404. Similarly, a portion 410 of the second I picture 412 is removed from the bulk data 402 and established as part of the key data 404. Because I pictures are critical in that the P and B pictures are based on motion estimation, the removal of at least a portion of one or more I pictures may make reconstitution of the content impossible based on the remaining bulk data 402 alone. The removed portions of the one or more I pictures are then established as the second portion of the data 404 for streaming to the client devices.

As discussed above, the second portion of the data 404 may be encrypted prior to streaming it to the client devices. And again, this secured second part of the data is typically not stored and security methods can be updated to reduce vulnerability. The unsecured first portion of the data 402 is useless without the lower bandwidth secured second part 404.

In some embodiments, it will not be apparent which data has been removed from the content and how the content is reconstituted. This knowledge may be embedded in the player application. Thus, in some embodiments tamper proofing methods for the player application and/or device may be used to further enhance security. That is, in some embodiments part of the security of the system may be to make the player sufficiently tamper proof that it is hard for a potential pirate to figure out what method was used for removing essential information. If a pirate does figure out how to record the decrypted key data stream for a movie, then it potentially unlocks the movie for everyone who has a disc.

Thus, in some embodiments this business risk may be considered and balanced by content owners in deciding how much tamper proofing and security to build into player applications and/or devices. But even in the scenario where a pirate discovers a way to record the decrypted key data stream, the pirate would still need to either re-master the whole movie or create a PC player application and allow the key-data to be downloaded to enable a pirated disc. It is anticipated that these avenues can be quickly shut down and will not be attractive to most honest users. Furthermore, in some embodiments regular changes to the application and the way in which the key data is separated, encrypted and reconstituted may be used to make it more difficult for hackers to enable discs.

As mentioned above, the methods and techniques described herein may be applied to any type of digital content. Thus, in some embodiments the same techniques may be applied to games and music. For example, for music a huge catalog of songs may be stored on a single DVD or Blu-ray disc. The songs would be worthless without the key data. And in some embodiments, for the case of lower bandwidth content such as music or some smaller games or movies for portable game devices, the bulk data may also be distributed online and downloaded in any unsecured fashion such as bit torrent or file sharing methods.

Figure 5:
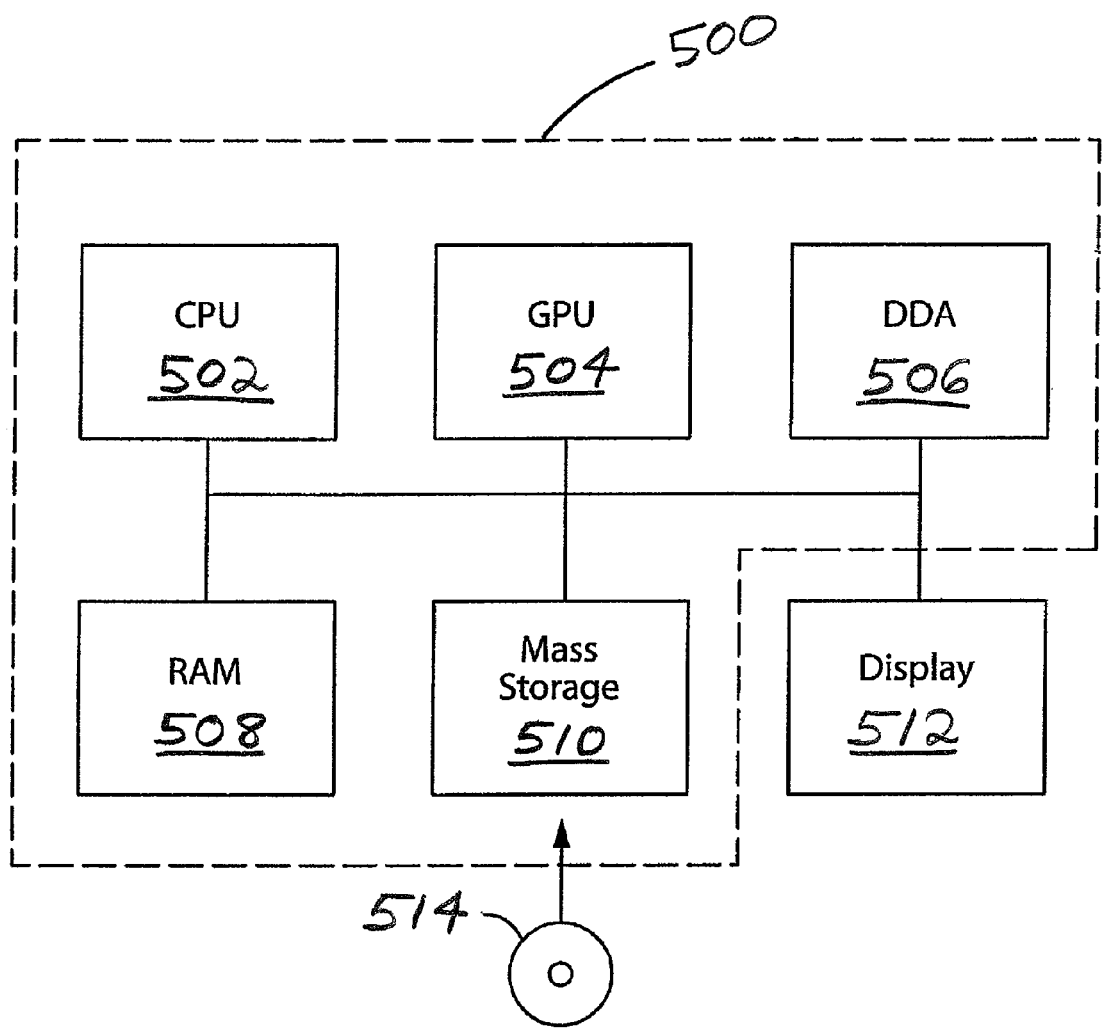
FIG. 5 is a block diagram illustrating a device/system that may be used to run, implement and/or execute the methods shown and described herein in accordance with embodiments of the present invention.

As mentioned above, the client device 102 (FIG. 1) may comprise a DVD player, CD player, game console, entertainment system, handheld device, computer, or any other type of device that plays media. Moreover, the methods and techniques described herein may be utilized, implemented and/or run on many different types of computers, graphics workstations, televisions, entertainment systems, video game systems, DVD players, DVRs, media players, home servers, video game consoles, and the like. Referring to FIG. 5, there is illustrated a system 500 that may be used for any such implementations of client devices in order to utilize, implement and/or execute the methods and techniques described herein. Use of the system 500, however, is certainly not required.

By way of example, the system 500 may include, but is not required to include, a central processing unit (CPU) 502, a graphics processing unit (GPU) 504, digital differential analysis (DDA) hardware 506, a random access memory (RAM) 508, and a mass storage unit 510, such as a disc drive. Thus, in some embodiments the system 500 comprises a processor based system. The system 500 may be coupled to, or integrated with, a display 512, such as for example any type of display.

The CPU 502 and/or GPU 504 may be used to execute or assist in executing the steps of the methods and techniques described herein, and various program content and images may be rendered on the display 512. Removable storage media 514 may optionally be used with the mass storage unit 510, which may be used for storing code that implements any of the methods and/or techniques described herein. However, any of the storage devices, such as the RAM 508 or mass storage unit 510, may be used for storing such code. Either all or a portion of the system 500 may be embodied in any type of device, such as for example a television, computer, video game console or system, handheld device, or any other type of device, including any type of device mentioned herein.

While the invention herein disclosed has been described by means of specific embodiments and applications thereof, numerous modifications and variations could be made thereto by those skilled in the art without departing from the scope of the invention set forth in the claims.

What is claimed is:

1. A method comprising:
    establishing a device for playing content, the content being constituted of a set of data, the set of data being partitioned into a first portion of the data and a second portion of the data;
    receiving the first portion of the data by a user inserting a physical removable storage media into the device, wherein the first portion of the data is stored on the physical removable storage media without the second portion of the data being stored on the physical removable storage media before being distributed to the user;
    receiving the second portion of the data, wherein the second portion of the data is streamed and wherein the second portion of the data includes essential information for reconstructing the content, and wherein the first portion of the data is not streamed with the second portion of the data; and
    playing the content by combining the first portion of the data with the second portion of the data to correctly reconstruct the content;
    wherein the playing the content comprises playing the content in a streaming manner such that the content is played as the second portion of the data is being received;
    wherein the second portion of the data comprises a portion of an intra-coded picture, wherein the portion of the intra-coded picture is less than an entirety of the intra-coded picture, and the entirety of the intra-coded picture is not included in the second portion of the data; and
    wherein, in response to the physical removable storage media being inserted into the device, the device automatically connects to a server, authenticates the user, and starts streaming the second portion of the data.

2. The method of claim 1, wherein the second portion of the data comprises encrypted information.

3. The method of claim 1, wherein the second portion of the data comprises less information than the first portion of the data.

4. The method of claim 1, wherein the first portion of the data comprises unsecured data.

5. The method of claim 1, wherein only a fraction of the second portion of the data necessary for seamless playback is stored at any given time, wherein the fraction is less than all of the second portion of the data.

6. A system comprising:
    one or more processor-based devices configured to perform the steps comprising:
    removing information from a set of data constituting content, wherein the information is essential for playing the content, wherein the step of removing information from the set of data comprises removing a portion of an intra-coded picture, wherein the portion of the intra-coded picture is less than an entirety of the intra-coded picture;

establishing a remainder of the data after the removing step as a first portion of the data;

establishing the removed essential information as a second portion of the data;

establishing a streaming system for streaming the second portion of the data to client devices, wherein the streaming system is configured so that the client devices play the content in a streaming manner such that the content is played as the second portion of the data is being received, and wherein the first portion of the data is not streamed with the second portion of the data; and storing the first portion of the data on a physical removable storage media without the second portion of the data being stored on the physical removable storage media before being distributed to a user;

wherein, at least one of the client devices receives the first portion of the data by the user inserting the physical removable storage media into the at least one client device; and wherein, in response to the physical removable storage media being inserted into the at least one client device, the at least one client device automatically connects to a server, authenticates the user, and starts streaming the second portion of the data.

7. The system of claim 6, wherein the second portion of the data comprises encrypted information.

8. The system of claim 6, wherein the second portion of the data comprises less information than the first portion of the data.

9. The system of claim 6, wherein the first portion of the data comprises unsecured data.

10. A non-transitory tangible computer-readable storage medium storing a computer program executable by a processor based system, the computer program causing the processor based system to execute steps comprising:

removing information from a set of data constituting content, wherein the information is essential for playing the content, wherein the step of removing information from the set of data comprises removing a portion of an intra-coded picture, wherein the portion of the intra-coded picture is less than an entirety of the intra-coded picture;

establishing a remainder of the data after the removing step as a first portion of the data;

establishing the removed essential information as a second portion of the data;

establishing a system for streaming the second portion of the data to client devices, wherein the system for streaming is configured so that the client devices play the content in a streaming manner such that the content is played as the second portion of the data is being received, and wherein the first portion of the data is not streamed with the second portion of the data; and storing the first portion of the data on a physical removable storage media without the second portion of the data being stored on the physical removable storage media before being distributed to a user;

wherein, at least one of the client devices receives the first portion of the data by the user inserting the physical removable storage media into the at least one client device; and wherein, in response to the physical removable storage media being inserted into the at least one client device, the at least one client device automatically connects to a server, authenticates the user, and starts streaming the second portion of the data.

11. The storage medium of claim 10, wherein the second portion of the data comprises encrypted information.

12. The storage medium of claim 10, wherein the second portion of the data comprises less information than the first portion of the data.

13. The storage medium of claim 10, wherein the first portion of the data comprises unsecured data.

14. A method for use in enhancing security of content, comprising:

removing information from a set of data constituting the content, wherein the information is essential for playing the content, wherein the step of removing information from the set of data comprises removing a portion of an intra-coded picture, wherein the portion of the intra-coded picture is less than an entirety of the intra-coded picture;

establishing a remainder of the data after the removing step as a first portion of the data;

establishing the removed essential information as a second portion of the data;

establishing a system for streaming the second portion of the data to client devices, wherein the system for streaming is configured so that the client devices play the content in a streaming manner such that the content is played as the second portion of the data is being received, and wherein the first portion of the data is not streamed with the second portion of the data; and storing the first portion of the data on a physical removable storage media without the second portion of the data being stored on the physical removable storage media before being distributed to a user;

wherein, at least one of the client devices receives the first portion of the data by the user inserting the physical removable storage media into the at least one client device; and wherein, in response to the physical removable storage media being inserted into the at least one client device, the at least one client device automatically connects to a server, authenticates the user, and starts streaming the second portion of the data.

15. The method of claim 14, wherein the second portion of the data comprises less information than the first portion of the data.

16. The method of claim 14, further comprising:
encrypting the second portion of the data.

17. The method of claim 14, wherein the first portion of the data comprises unsecured data.

* * * * *